(12) United States Patent
Harold

(10) Patent No.: US 10,728,296 B1
(45) Date of Patent: *Jul. 28, 2020

(54) SYSTEM, METHOD AND APPARATUS FOR DISTRIBUTED CONTENT DISSEMINATION

(71) Applicant: GOKNOWN LLC

(72) Inventor: Michael Harold, Shreveport, LA (US)

(73) Assignee: GoKnown LLC, Greenwich ( * ) Notice: Subject to any disclaimer, the term of this patent is extended or adjusted under 35 U.S.C. 154(b) by 292 days.

This patent is subject to a terminal disclaimer.

(21) Appl. No.: 15/161,385

(22) Filed: May 23, 2016

Related U.S. Application Data

(63) Continuation of application No. 14/144,018, filed on Dec. 30, 2013, now Pat. No. 9,351,138, which is a continuation of application No. 11/889,941, filed on Aug. 17, 2007, now Pat. No. 8,620,207.

(60) Provisional application No. 60/838,438, filed on Aug. 18, 2006.

(51) Int. Cl.
*H04L 29/06* (2006.01)
*H04W 4/20* (2018.01)

(52) U.S. Cl.
CPC .......... *H04L 65/4084* (2013.01); *H04L 65/60* (2013.01); *H04L 69/16* (2013.01); *H04W 4/20* (2013.01)

(58) Field of Classification Search
CPC ..... H04W 12/06; H04W 28/06; H04W 28/22; H04W 48/02; H04W 48/04; H04W 76/025; H04W 84/18; H04W 88/12; H04W 88/16; H04W 92/14; H04W 4/20; H04W 40/20; H04W 4/12; H04L 67/1021; H04L 61/2007; H04L 63/10; H04L 65/60; H04L 12/18; H04L 65/4076
USPC .... 455/3.01–3.06, 41.1–41.3, 411, 419, 420; 709/203, 226, 228–229; 725/80–81, 100, 725/117, 120, 131; 370/328, 338, 392, 370/252, 310, 312, 337, 345, 400, 429, 370/465
See application file for complete search history.

(56) References Cited

U.S. PATENT DOCUMENTS

| | | | |
|---|---|---|---|
| 7,369,532 B2 * | 5/2008 | Silvester ............... | H04W 76/15 370/349 |
| 2006/0198396 A1 * | 9/2006 | Chang .................. | H04W 28/06 370/522 |

(Continued)

*Primary Examiner* — Inder P Mehra
(74) *Attorney, Agent, or Firm* — Van Dyke Intellectual Property Law; Raymond Van Dyke

(57) ABSTRACT

A wireless cellular or other device to control distribution and presentation of audio, video, or combined audio and video content transmitted from a content server and delivered to at least one contiguous device at substantially the same time. The cellular device sends control signals via various wireless communication protocols based upon user input. The control signals are sent to a content server attached to a TCP/IP network. The wireless cellular device and the content server interact through a request and reply interface, located within the wireless cellular device, based on inputs from the wireless device user. Content available for transmission from the content server is displayed and subsequently selected by the user. Separate audio and video content may be distributed to individually distinct rendering devices contiguous to and selected by the user. During or after the content is transmitted, the user may interact with the content through the wireless cellular device.

17 Claims, 9 Drawing Sheets

(56) References Cited

U.S. PATENT DOCUMENTS

| | | | | |
|---|---|---|---|---|
| 2007/0136778 | A1* | 6/2007 | Birger | G11B 19/025 |
| | | | | 725/117 |
| 2007/0157281 | A1* | 7/2007 | Ellis | H04N 7/17309 |
| | | | | 725/134 |
| 2008/0250147 | A1* | 10/2008 | Knibbeler | H04W 4/029 |
| | | | | 709/229 |
| 2009/0019061 | A1* | 1/2009 | Scannell, Jr. | G06F 16/9577 |
| 2009/0247126 | A1* | 10/2009 | Rumpf | H04W 48/04 |
| | | | | 455/411 |
| 2009/0298490 | A9* | 12/2009 | Janik | H04L 12/2856 |
| | | | | 455/419 |

\* cited by examiner

SYSTEM, METHOD AND APPARATUS FOR DISTRIBUTED CONTENT DISSEMINATION

RELATED APPLICATIONS

This application is a continuation of U.S. patent application Ser. No. 14/144,018, filed Dec. 30, 2013, now U.S. Pat. No. 9,531,138, which is a continuation of U.S. patent application Ser. No. 11/889,941, filed Aug. 17, 2007, now U.S. Pat. No. 8,620,207, and claims priority from Provisional Patent Application Ser. No. 60/838,438, filed Aug. 18, 2006, the subject matters of which are incorporated herein by reference.

FIELD OF THE INVENTION

The present invention relates generally to methods for distributing content to devices substantially contiguous to a person or device.

BACKGROUND OF THE INVENTION

Changes in the electronic distribution of audio and visual content have created an environment in which end-users have increasing control over the means by which they may hear, view and interact with any given digital content. Through the use of various methods that incorporate wireless and Internet technologies, for example, Apple's iTunes system, music may be downloaded into handheld wireless devices and stored in a persistent manner so that it may be listened to at some future time. Audio, video and combined audio-video content may also be downloaded into handheld wireless devices and then stored in a persistent manner so that it may be listened to and viewed at the user's discretion. Additionally, once stored, such audio-visual content can readily be transferred to other devices via simple commands.

In all cases where wireless cell phone devices are used to send, receive and store audio-visual content, one of three scenarios occurs. The first scenario involves the transfer of audio and visual content to another wireless cell phone device from a server, service or other wireless cell phone device acting itself as a server in a client-server relationship. The second scenario involves the transfer of audio and visual content from a wireless cell phone device acting as a server to one or more servers, services or other wireless cell phone devices acting as clients in a client-server relationship. The third scenario involves the use of a cell phone to control media devices by using wireless protocols such as SMS or Internet services such as Web browsers to request that media be sent to a specific device based on user requests.

At this time, the ability of a wireless cell phone user to control the distribution and delivery of digital content to physically contiguous audio and video devices is limited to a request-response model that does not allow the user to continuously interact with contiguous audio and visual display devices in real time over the Internet.

Orange France has created a service that allows customers of bars, restaurants and other businesses to choose a song from an SMS music menu to be played at the customer location. This service does not, however, provide a means to have the music sent to a speaker system located in direct proximity to the user. Neither does it provide the means to make selections using a cell phone and to have music videos provided to a visual display device and speaker system located in direct proximity to the user.

AT&T, Inc. provides subscribers with the ability to control their digital video controllers through Web-enabled phones by scheduling or deleting recordings on their in-home set-top boxes. This service does not, however, provide users with the means to control the dissemination of content to contiguous audio and display devices that may be located in public venues, such as airports and malls. Furthermore, this control mechanism is dependent on the presence of an in-home set-top box to display the audio and visual content. In other words, it does not allow content dissemination over the Internet to contiguous devices in real time.

In U.S. Published Patent Application No. 20070136778, Birger, Joffe and Netchitailo generally describe a method to use an apparatus with a processor, memory, a display screen and an input device to accept user input from a user, the use of which is to control the operation of multiple devices for purposes of playback on the part of each device. There is, however, no reference to the use of a wireless cell phone device to accomplish the same or similar tasks. Furthermore, the invention set forth does not allow the user to use the apparatus to control the dissemination of content over the Internet in public venues. As with the prior cited references, this one, too, is deficient.

None of the presently-known methods of wireless cell phone content delivery addresses the complexity of a distributed audio-visual user experience, i.e., both individual and multiple persons experiencing the same or similar content simultaneously or substantially simultaneously through respective contiguously located devices. Specifically, the prior art fails to demonstrate any method or system that disengages wireless cell phone users from the constraints of traditional audio-video media delivery by allowing the user of a wireless cell phone to interactively control the real-time delivery of audio-visual media to multiple audio devices, e.g., within hearing or other ranges of the cell phone user, and/or multiple visual display devices, e.g., within line-of-sight view of the wireless cell phone user, through the use of controls commonly-available on a standard wireless cell phone over the Internet.

There is, therefore, a present need to provide an improved paradigm for managing the distributed, multi-tier, real-time delivery of audio-visual content using a wireless cell phone that overcomes the aforementioned constraints of existing media distribution techniques, and that exploits the enhancements of the new technologies offered.

It is, accordingly, an object of the present invention to set forth an improved paradigm for the distribution of digital media using a wireless cell phone device as a controller.

It is another object of the present invention to provide a method and system for a wireless cell phone device user to specify the devices to which the audio and visual components of audio-visual content will be transmitted.

It is a further object of the present invention to provide a method and system for a wireless cell phone device user to specify the devices to which the audio components of audio-visual content will be transmitted independently of the devices to which the visual components of audio-visual content will be transmitted.

It is a further object of the present invention to provide a method and system whereby a wireless cell phone device may be used to control the concurrent, synchronous, real-time delivery of visual media to one or more display devices of the same or dissimilar type and to one or more audio devices of the same or dissimilar type.

It is a further object of the present invention to provide a method and system whereby a wireless cell phone device may be used to interact with audio and visual content that is being heard though one or more audio devices of the same or dissimilar type and seen through one or more display devices of the same or dissimilar type.

SUMMARY OF THE INVENTION

The present invention involves a method and system which permits the delivery of audio and visual content among multiple audio devices of similar and dissimilar type and multiple visual devices of similar and dissimilar type using a wireless cell phone device as the method of control. Audio devices include, but are not limited to, wireless and wireline speaker systems, earphones, headphones, handsets, cell phones, handheld wireless devices and other devices that have inputs that originate as electrical signals and resulting outputs that are acoustic in nature. Visual devices include, but are not limited to, wireless or wireline connected plasma screens, LCD screens, televisions, digital projectors, computer monitors, and other devices that have inputs that originate as digital information and resulting outputs that are visual in nature. The unique method and system described herein creates an audio-visual environment capable of being interactively controlled by a wireless cell phone device, in which all audio and video components can be transmitted to multiple audio, visual and audio-visual devices in a dynamic, concurrent, synchronous, real-time manner.

BRIEF DESCRIPTION OF THE DRAWINGS

A more complete understanding of the system and method of the present invention may be obtained by reference to the following detailed description when taken in conjunction with the accompanying Drawings wherein.

DETAILED DESCRIPTION

The following detailed description is presented to enable any person skilled in the art to make and use the invention. For purposes of explanation, specific nomenclature is set forth to provide a thorough understanding of the present invention. However, it will be apparent to one skilled in the art that these specific details are not required to practice the invention. Descriptions of specific applications are provided only as representative examples. Various modifications to the preferred embodiments will be readily apparent to one skilled in the art, and the general principles defined herein may be applied to other embodiments and applications without departing from the spirit and scope of the invention. The present invention is not intended to be limited to the embodiments shown, but is to be accorded the widest possible scope consistent with the principles and features disclosed herein.

Figure 1:
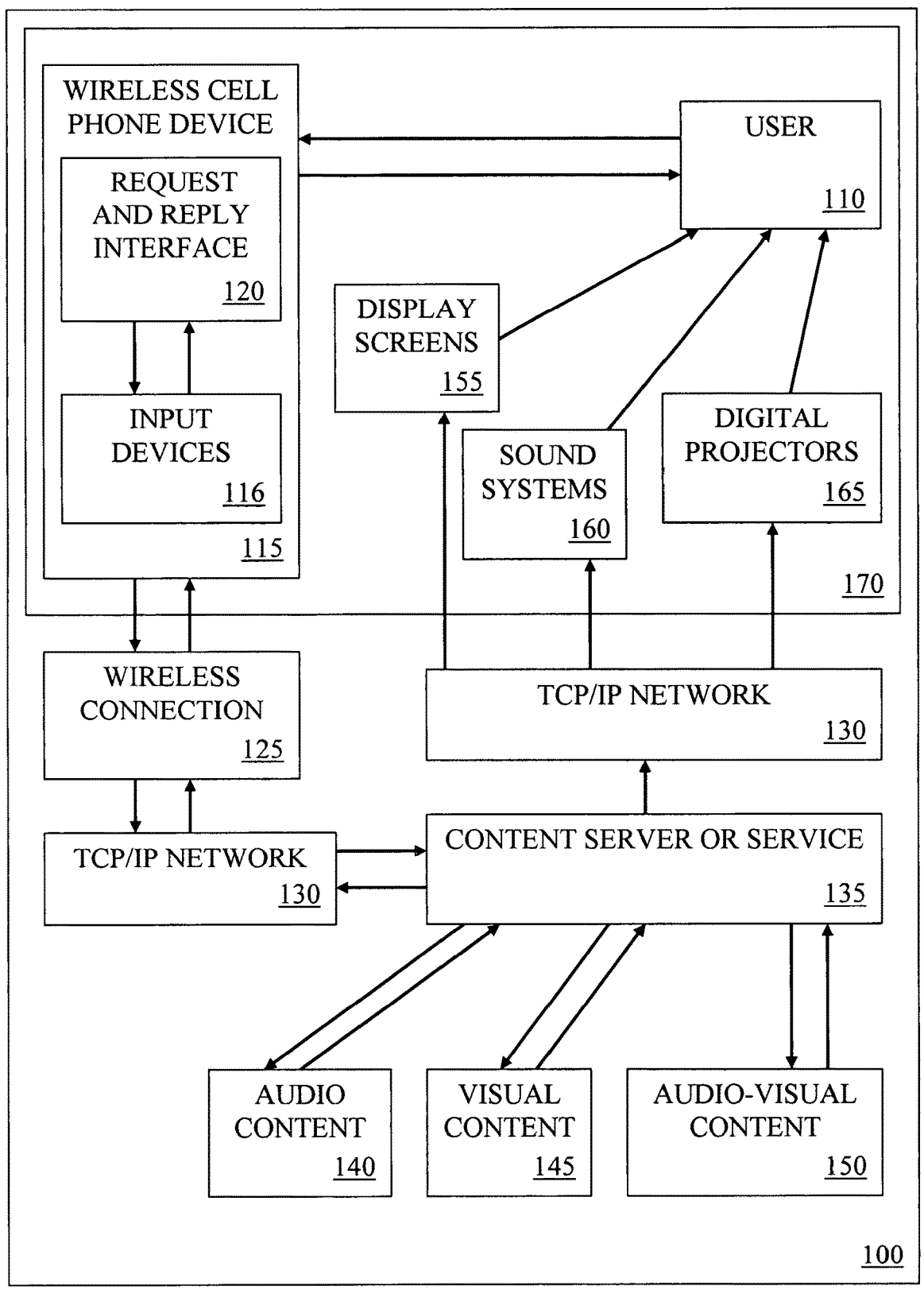
FIG. 1 illustrates a content delivery system for a wireless cell phone device in accordance with the principles of the present invention.

With reference to FIG. 1 of the Drawings, there is illustrated therein a distributed communications network, generally designated by the reference numeral 100, pursuant to the teachings of the present invention. In particular, a user 110 of the network 100 uses any of a variety of wireless cellular devices, including a handheld computer, a cellular telephone, a PDA device, or any other personal portable wireless device, generally designated by the reference numeral 115, that has as part of its function the ability to operate as a wireless cell phone device, as it is understood in the art. As shown in the figure, the user 110 uses input devices 116, such as a keypad, control keys or a touchscreen commonly associated with the use of a wireless cell phone device 115, to interact with a request and reply interface, designated by the reference numeral 120, which, through a wireless connection, generally designated by the reference numeral 125, transmits information to a TCP/IP network, generally designated by the reference numeral 130, where the information is received by a content server or content service 135 for distribution to others.

The content server or service 135 identifies and retrieves the specified content in the form of audio content 140, visual content 145 or combined audio-visual content 150, and sends, via the aforementioned TCP/IP network 130, the requested content to the discrete specified devices, which may be plasma, LCD or other types of display screens 155, acoustical sound systems 160, digital projector systems 165, or any combination thereof, as illustrated in FIG. 1. Those exemplary devices, including the wireless cell phone device 115, the display screens 155 whose visual output is substantially within the sight of the user 110, the acoustical sound systems 160 whose acoustical output is substantially within the hearing of the user 110, and the digital projectors 165 whose visual output is substantially within the sight of the user, are referred to collectively as the user's field of vision, hearing and control, and are designated herein by the reference numeral 170. It should, of course, be understood that a variety of other devices substantially contiguous the user 110 may be employed to receive and utilize the content transmitted thereto, and are also within the aforementioned user's field of vision, hearing and control 170.

Figure 2:
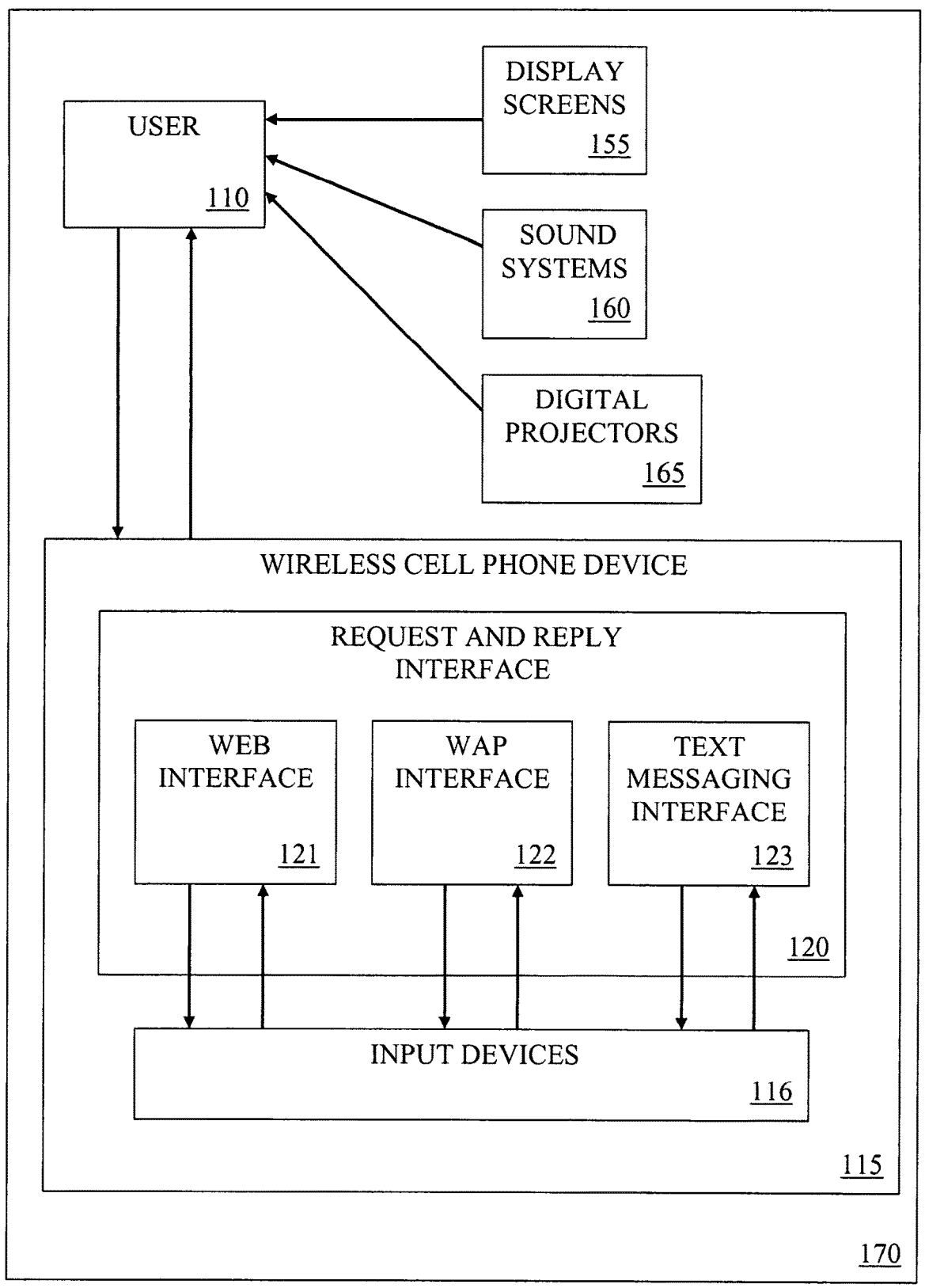
FIG. 2 illustrates a content delivery system using a wireless cell phone device as controller in which various protocols including but not limited to Web interfaces, Wireless Access Protocol interfaces and wireless text messaging may be used to specify the content as well as the audio and visual devices to which the content will be delivered in accordance with the principles of the present invention.

With reference now to FIG. 2, a system and method are illustrated whereby the user 110 may use the aforedescribed wireless cell phone device 115 and its request and reply interface 120 to specify the audio and visual content, as well as the devices to which the specified audio and visual content will be delivered. In a preferred embodiment, the specification of the content, as well as the specification of the devices to which the content will be delivered, may be determined as the result of the interaction of the user 110 with the wireless cell phone device 115, its input devices 116, the request and reply interface 120, and other devices in the user's field of vision, hearing and control 170, including one or more display screens 155, one or more acoustical sound systems 160 and one or more digital projector systems 165, as illustrated and described in connection with FIG. 1.

As shown in FIG. 2, one method by which both content and devices may be specified is through the use of a Web interface 121. For example, the user 110 uses the Web interface 121, itself a component of the request and reply interface 120, to specify the content to be displayed and/or heard. The information describing the content may be specified in its entirety on the Web interface 121, or, alternatively, the information describing the content may be specified through any combination of visual and audio information provided by the wireless cell phone device 115 and its Web interface 121, the display screens 155, sound systems 160 and the digital projectors 165 within the user's field of vision, hearing and control 170. With further reference to FIG. 2, the user 110 uses the Web interface 121 of the wireless cell phone device 115, along with input devices 116 available on the wireless cell phone device 115, to specify the content which will be delivered to the devices within the user's field of vision, hearing and control 170. Furthermore, the user 110 uses the Web interface 121 of the wireless cell phone device 115, along with respective input devices 116 available on the wireless cell phone device 115 to specify the display screens 155, sound systems 160 and digital projectors 165 within the user's field of vision, hearing and control 170 to which the content will be delivered.

With further reference to FIG. 2, another method by which both content and devices may be specified is through the use of a Wireless Access Protocol (WAP) interface 122. As noted above in connection with the Web interface 121, the Wireless Access Protocol interface 122 may be used to specify both the content and the devices to which the content will be delivered using methods similar to those methods described previously and with more particularity with respect to the Web interface 121.

With further reference to FIG. 2, a further method by which both content and devices may be specified is through the use of a text messaging interface 123. As noted above in connection with the Web interface 121 and the Wireless Access Protocol interface 122, the text messaging interface 123 may also be used to specify both the content and the devices to which the content will be delivered using methods similar to those methods described previously and with more particularity with respect to the Web interface 121. It should, of course, be understood that additional interfaces are possible, including a voice activation interface 120 either alone or in combination with tactile approaches.

Figure 3A:
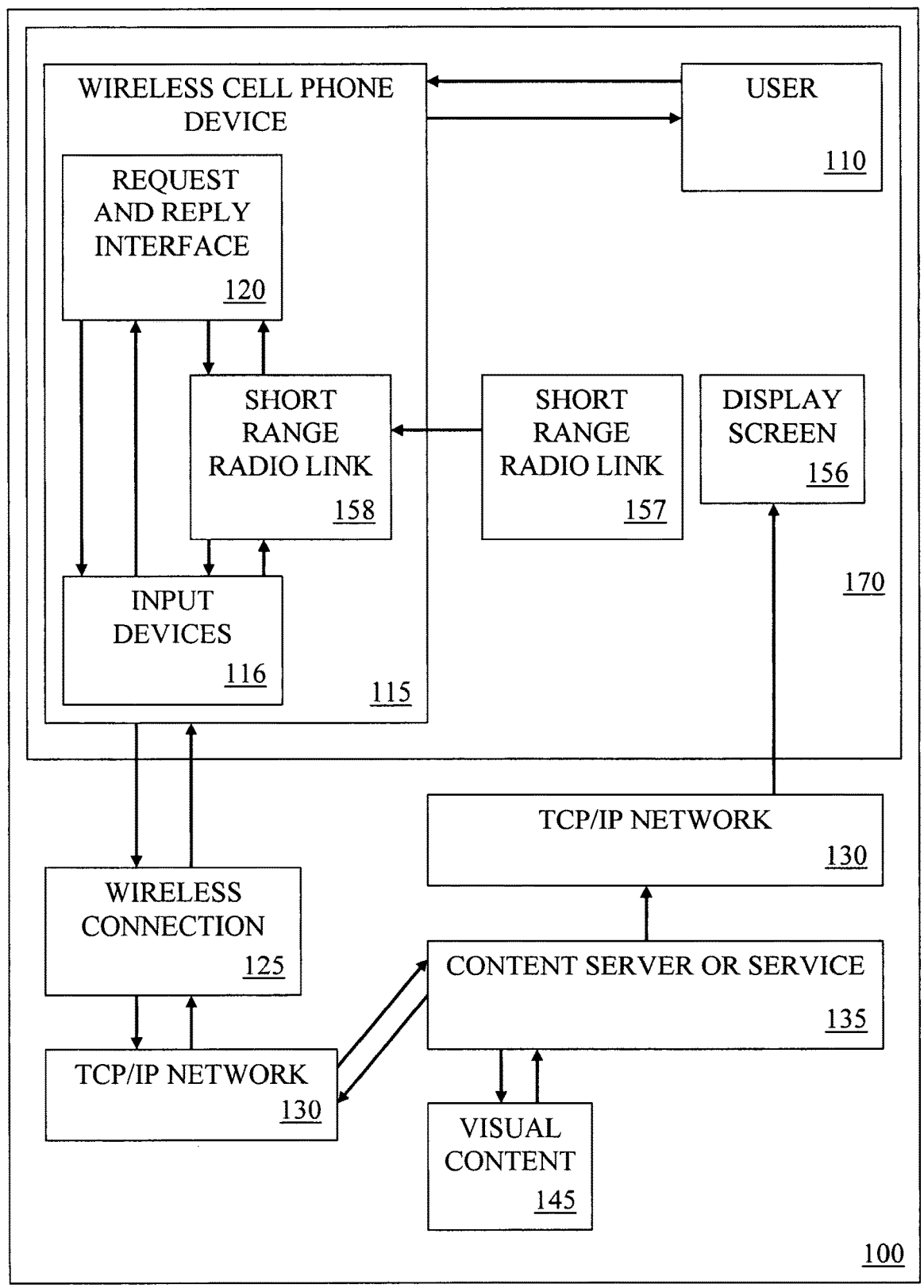
FIG. 3A illustrates a preferred embodiment for implementing a content delivery system for the interaction of a wireless cell phone device with a display device in accordance with the principles of the present invention.

With reference now to FIG. 3A of the Drawings, there is illustrated a preferred embodiment for implementing a content delivery system for the interaction of a wireless cell phone device with a display device. In this embodiment, the user 110 uses a wireless cell phone device 115 to obtain a wireless connection 125 with a TCP/IP network 130 that, in turn, accesses a content server or services 135, as set forth hereinabove, for outside distribution to other devices. The user then uses the information provided by the request and reply interface 120 to specify the content to be displayed. It should be understood that the information describing the content may be specified in its entirety via the wireless cell phone device 115, or, alternatively, through any combination of visual and audio information provided by the wireless cell phone device 115 and at least one display screen 156 within the user's field of vision, hearing and control 170.

With further reference to FIG. 3A, the user 110 uses the request and reply interface 120 of the wireless cell phone device 115, along with input devices 116 available on the wireless cell phone device 115, to specify visual content 145, which will be delivered to at least one display screen 156 within the user's field of vision, hearing and control 170. Furthermore, the user 110 uses the request and reply interface 120 of the wireless cell phone device 115, along with input devices 116 available on the wireless cell phone device 115, to specify the identity of the particular display screen or screens 156 within the user's field of vision, hearing and control 170 to which the visual content 145 will be delivered. Alternatively, rather than specifying the display screen or screens 156 to which the content will be delivered using input devices 116, such as a keypad, control keys or a touchscreen, a shortrange frequency hopping radio link device 157, in close physical proximity to the user's 110 wireless cell phone device 115, may be used to transmit the identity of the display screen or screens 156 to a corresponding shortrange frequency hopping radio link device 158 contained within the wireless cell phone device 115, where the link device 158 may be used as input to the request and reply interface 120 and other input devices 116 contained within the wireless cell phone device 115 to identify the display screen or screens 156. It should, of course, be understood that alternate forms of wireless linkages may be employed to accomplish these short range transmission requirements, and a frequency hopping radio linkage is only exemplary.

Figure 3B:
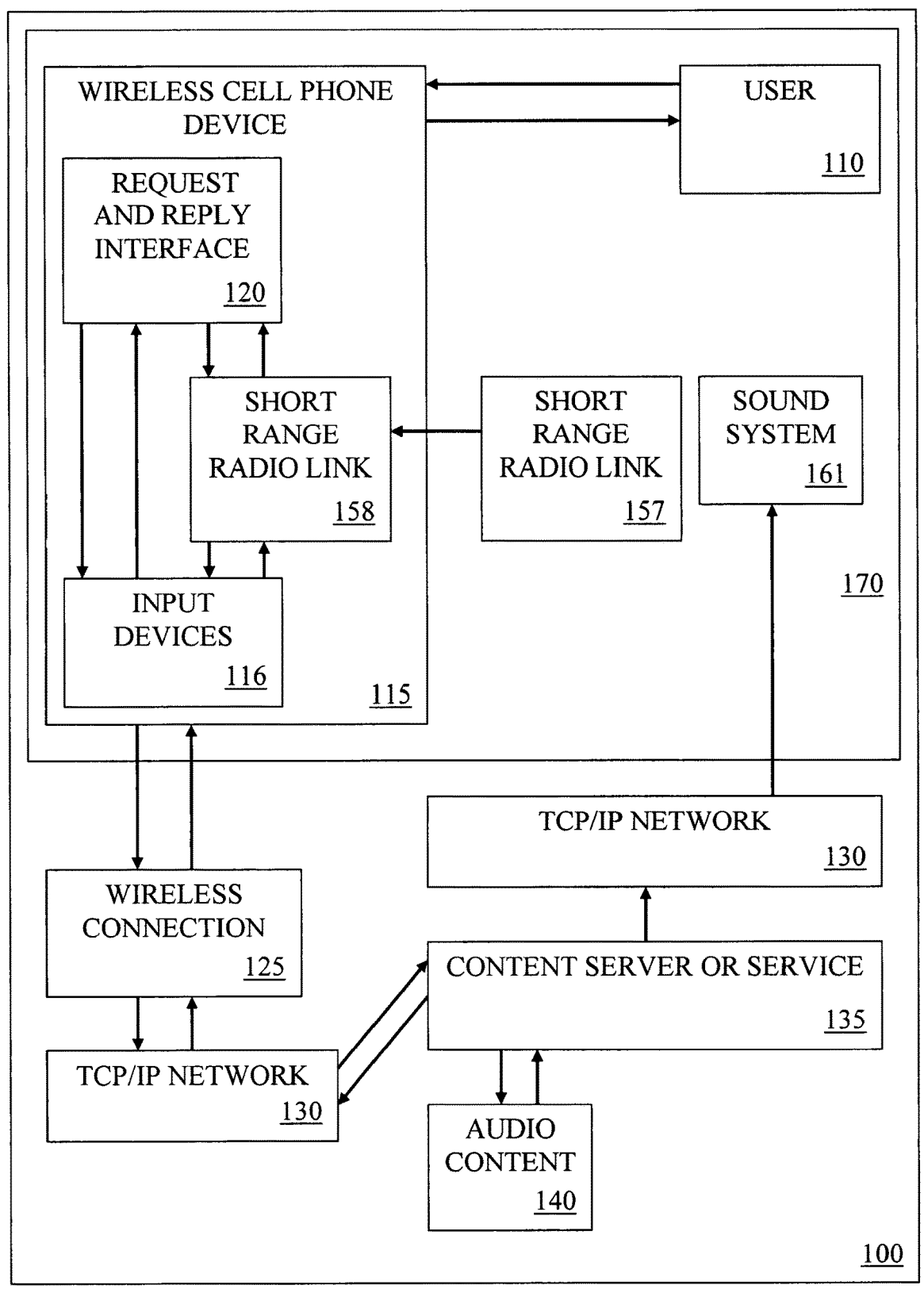
FIG. 3B illustrates a preferred embodiment for implementing a content delivery system for the interaction of a wireless cell phone device with a sound system device in accordance with the principles of the present invention.

With reference now to FIG. 3B, which describes a preferred embodiment for implementing a content delivery system for the interaction of a wireless cell phone device with a sound system, the user 110 uses the wireless cell phone device 116 to obtain a wireless connection 125 with a TCP/IP network 130 that, in turn, accesses a content server or services 135. As with the embodiment illustrated and described in connection with FIG. 3A, the user uses the information provided by the request and reply interface 120 to specify the audio content to be transmitted. The information describing the content may be specified in its entirety via the wireless cell phone device 115, or, alternatively, through any combination of visual and audio information provided by the wireless cell phone device 115 and at least one sound system 161 within the user's field of vision, hearing and control 170.

With further reference to FIG. 3B, the user 110 uses the request and reply interface 120 of the wireless cell phone device 115, along with input devices 116 available on the wireless cell phone device 115, to specify audio content 140 which will be delivered to at least one sound system or systems 161 within the user's field of vision, hearing and control 170. Furthermore, the user 110 uses the request and reply interface 120 of the wireless cell phone device 115, along with input devices 116 available on the wireless cell phone device 115, to specify the identity of the particular sound system or systems 161 within the user's field of vision, hearing and control 170 to which the audio content 140 will be delivered. Alternatively, rather than specifying the sound system or systems 161 to which the content will be delivered using input devices 116, such as a keypad, control keys or a touchscreen, the aforementioned short-range frequency hopping radio link device 157 or other wireless linkage, in close physical proximity to the user's 110 wireless cell phone device 115, may be used to transmit the identity of the sound system or systems 161 to the corresponding shortrange frequency hopping radio link device 158 contained within the wireless cell phone device 115, where the link device 158 may be used as input to the request and reply interface 120 and other input devices 116 contained within the wireless cell phone device 115 to identify the sound system or systems 161.

Figure 3C:
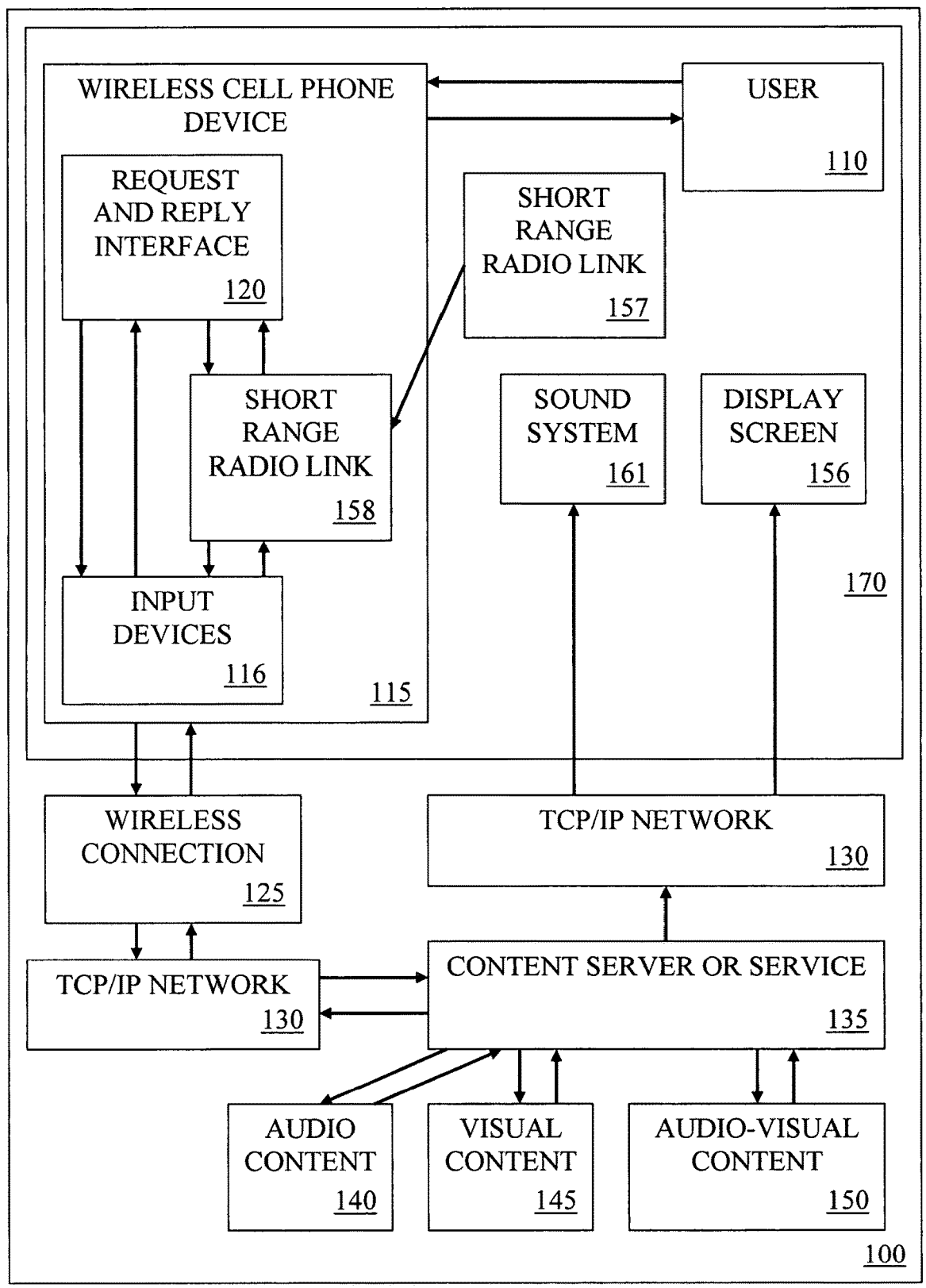
FIG. 3C illustrates a preferred embodiment for implementing a content delivery system for interaction of a wireless cell phone device with a display device and a separate sound system device in accordance with the principles of the present invention.

With reference now to FIG. 3C of the Drawings, an additional preferred embodiment for implementing a content delivery system for interaction of a wireless cell phone device with a display device and a separate sound system device is described, in which the user 110 uses the wireless cell phone device 115 to obtain a wireless connection 125 with a TCP/IP network 130 that, in turn, accesses a content server or services 135. The user uses the information provided by the request and reply interface 120 to specify the audio and visual content to be transmitted. As before, the information describing the content may be specified in its entirety via the wireless cell phone device 115, or, alternatively, through any combination of visual and audio information provided by the wireless cell phone device 115 to at least one display screen 156 and at least one sound system 161 within the user's field of vision, hearing and control 170.

With further reference to FIG. 3C, the user 110 uses the request and reply interface 120 of the wireless cell phone device 115, along with input devices 116 available on the wireless cell phone device 115, to specify the audio content 140 which will be delivered to said at least one sound system 161 and the visual content 145 which will be delivered to said at least one display screen 156 within the user's field of vision, hearing and control 170. Alternatively, the content server or service 135 may deliver combined audio-visual content 150 to the sound system or systems 161 and the display screen or screens 156 by delivering the audio portion of the audio-visual content 150 to the sound system or systems 161 and the visual portion of the audio visual content 150 to the display screen or screens 156 within the user's field of vision, hearing and control 170. Furthermore, the user 110 uses the request and reply interface 120 of the wireless cell phone device 115, along with input devices 116 available on the wireless cell phone device 115, to specify the identity of the particular sound system or systems 161 and the identity of the particular display screen or screens 156 within the user's field of vision, hearing and control 170 to which the audio content 140 and the visual content 145 will be delivered.

Furthermore, the user 110 may also use the request and reply interface 120 of the wireless phone device 115, along with input devices available on the wireless cell phone device 115, to specify a single identity for that sound system 161 and the display screen 156 or to specify an identity for a group of sound systems 161 and a group of display screens, all within the user's field of vision, hearing and control 170 to which the specified audio content 140 and the visual content 145 or the combined audio-visual content 150 will be delivered. Alternatively, rather than specifying the sound system 161 and display screen 156 to which the content will be delivered using input devices 116, such as a keypad, control keys or a touchscreen, the aforementioned short-range frequency hopping radio link device 157, or other wireless linkage, in close physical proximity to the user's 110 wireless cell phone device 115, may be used to transmit the identity or identities of the sound system or systems 161 and display screen or screens 156 to the corresponding shortrange frequency hopping radio link device 158 contained within the wireless cell phone device 115, where the link device 158 may be used as input to the request and reply interface 120 and other input devices 116 contained within the wireless cell phone device 115 to identify the sound system or system 161 and display screen or screens 156.

Figure 3D:
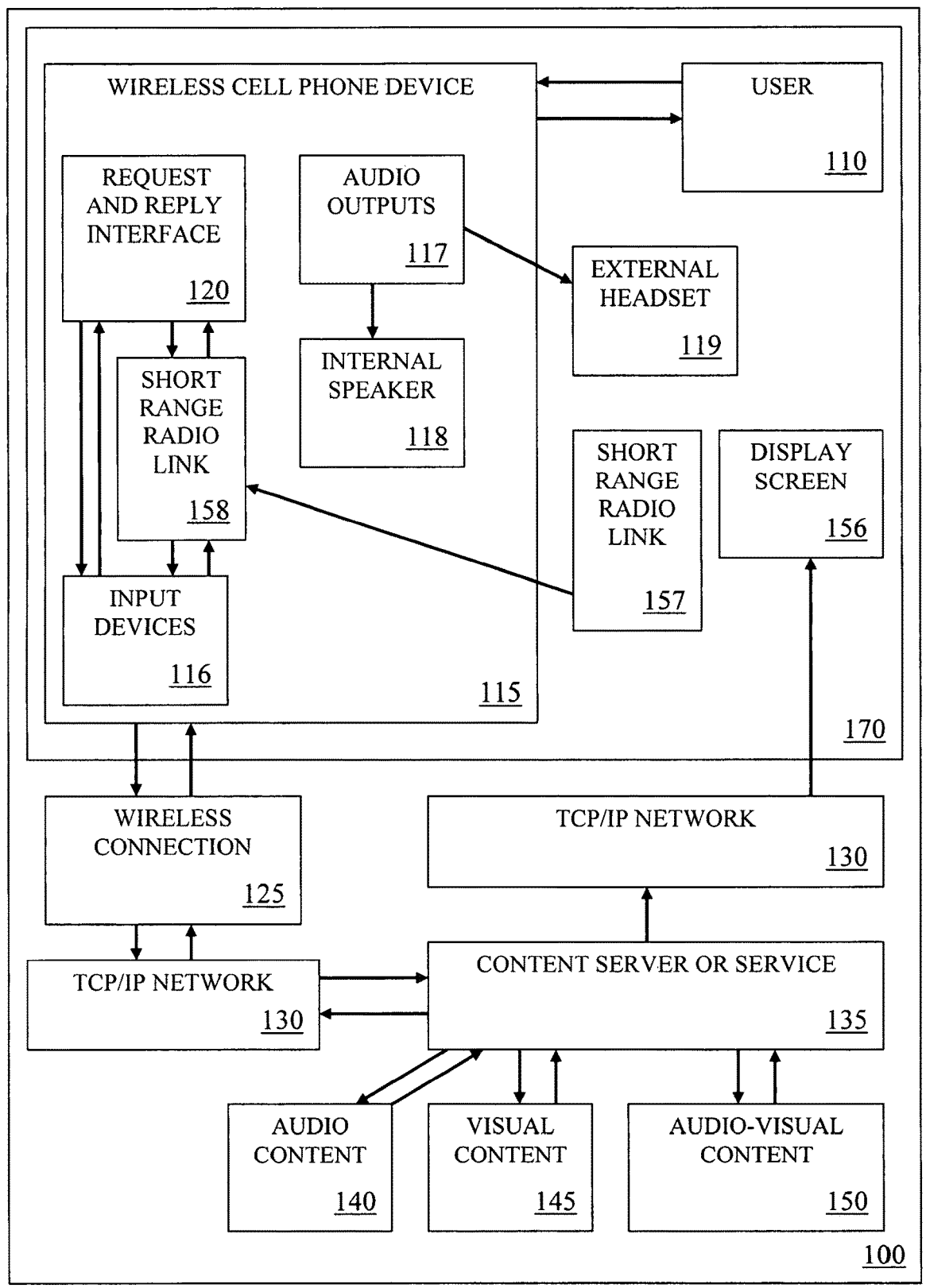
FIG. 3D illustrates a preferred embodiment of a content delivery system for interaction of a wireless cell phone device with a display device and the wireless cell phone device's internal audio device pursuant to the teachings of the present invention.

With reference now to FIG. 3D, there is illustrated a further preferred embodiment of a content delivery system for interaction of a wireless cell phone device with a display device and the wireless cell phone device's internal audio outputs, in which the user 110 uses the wireless cell phone device 116 to obtain a wireless connection 125 with a TCP/IP network 130 that, in turn, accesses a content server or services 135. The user 110 uses the information provided by the request and reply interface 120 to specify the audio and visual content to be transmitted. As noted, the information describing the content may be specified in its entirety via the wireless cell phone device 115, or, alternatively, through any combination of visual and audio information provided by the wireless cell phone device 115 and at least one display screen 156 within the user's field of vision, hearing and control 170.

With further reference to FIG. 3D, the user 110 uses the request and reply interface 120 of the wireless cell phone device 115, along with input devices 116 available on the wireless cell phone device 115, to specify the audio content 140 which will be delivered to the wireless cell phone device 115 through audio outputs 117 either to an internal speaker 118 of the wireless cell phone device 115 or to an external headset 119 of the wireless cell phone device 115, and the visual content 145 which will be delivered to the display screen or screens 156 within the user's field of vision, hearing and control 170. The content server or service 135 may deliver combined audio-visual content 150 to the wireless cell phone device 115 and the display screen or screens 156 by delivering the audio portion of the audio-visual content 150 to the wireless cell phone device 115, where the audio is transmitted through the wireless cell phone device's 115 audio outputs 117 either to the aforedescribed internal speaker 118 or to the external headset 119, and the visual portion of the audio visual content 150 to the display screen or screens 156 within the user's field of vision, hearing and control 170.

Furthermore, the user 110 uses the request and reply interface 120 of the wireless cell phone device 115, along with input devices 116 available on the wireless cell phone device 115, to specify the identity of the particular display screen 156 or a group of screens 156 within the user's field of vision, hearing and control 170 to which the visual content 145 will be delivered. Alternatively, rather than specifying at least one display screen 156 to which the content will be delivered using input devices 116, such as a keypad, control keys or a touchscreen, the aforementioned shortrange frequency hopping radio link device 157, or other wireless linkage, in close or contiguous physical proximity to the wireless cell phone device 115, may be used to transmit the identity of the display screen 156 or group of screens 156 to the corresponding shortrange frequency hopping radio link device 158 contained within the wireless cell phone device 115, where the link device 158 may be used as input to the request and reply interface 120 and other input devices 116 contained within the wireless cell phone device 115 to identify respective sound systems 161 and display screens 156.

Figure 4:
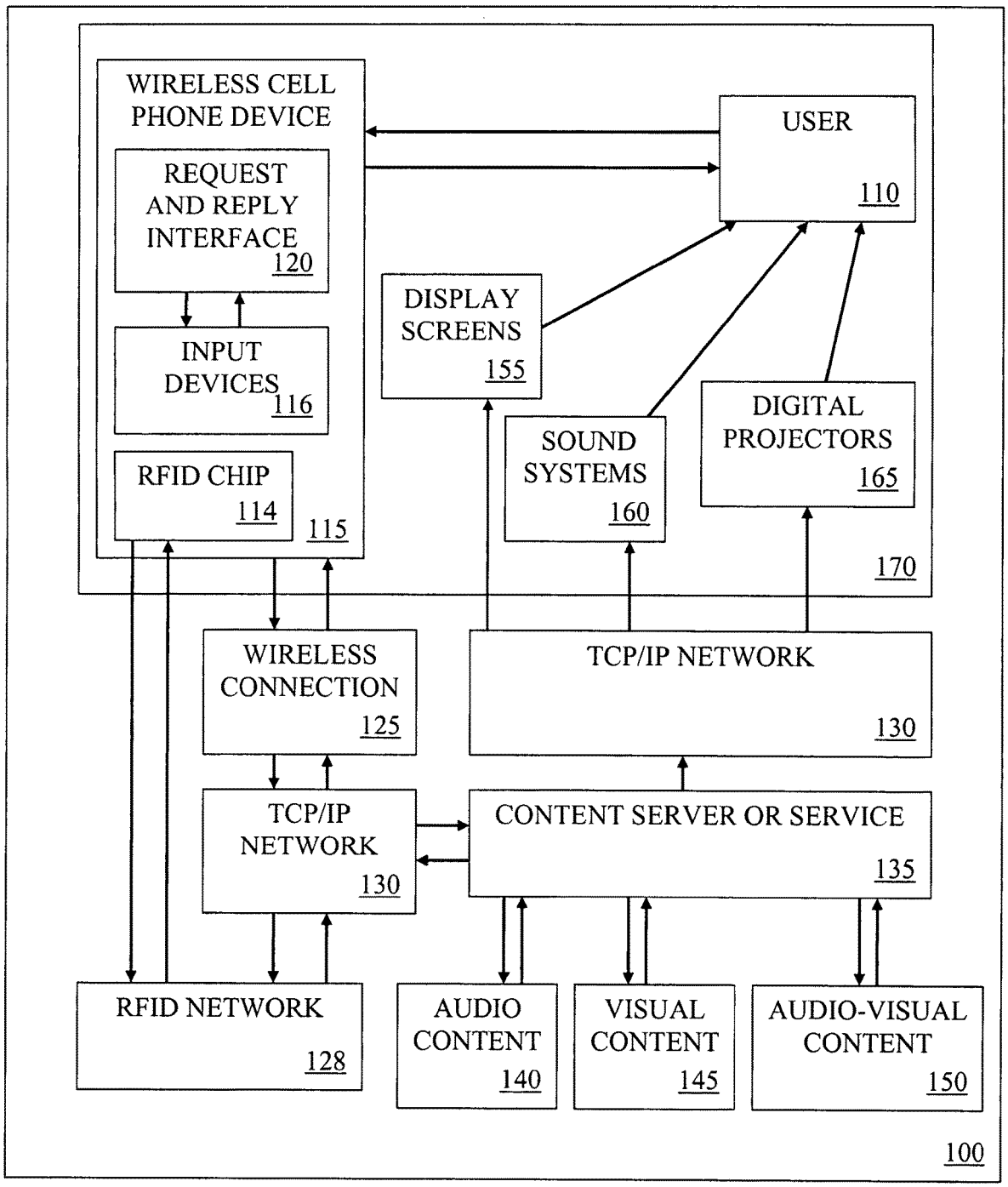
FIG. 4 illustrates a preferred embodiment for implementing a content delivery system for interaction of a wireless cell phone device with one or more display devices, sound systems and or projector systems using a Radio Frequency Identification (RFID) chip and RFID network to identify the physical location of the cell phone in accordance with the principles of the present invention.

With reference now to FIG. 4 of the Drawings, there is illustrated therein a preferred embodiment for implementing a content delivery system for the interaction of a wireless cell phone device having a radio frequency identification or RFID chip 114 either in or on the wireless cell phone device 115. As before, the user 110 uses the wireless cell phone device 115 to obtain a wireless connection 125 with a TCP/IP network 130 that, in turn, accesses a content server or service 135. The user 110 uses the information provided by the request and reply interface 120 to specify the content to be transmitted. As described hereinabove, the information describing the content may be specified in its entirety via the wireless cell phone device 115, or, alternatively, through any combination of visual or audio information provided by the request and reply interface 120 and other information contained within the user's field of vision, hearing and control 170. Rather than specifying respective display screens 155, sound systems 160 and/or digital projectors 165, to which the content will be delivered, an RFID network 128 may be used to identify the physical location of the wireless cell phone device 115 and to communicate that information through the TCP/IP network 130 to the content server or service 135, as shown in FIG. 4. The content server or service 135 uses the physical location of the wireless cell phone device 115 to identity the particular or respective display screens 155, sound systems 160 and or digital projectors 165 that are contiguous or to which the content can otherwise be delivered.

Figure 5:
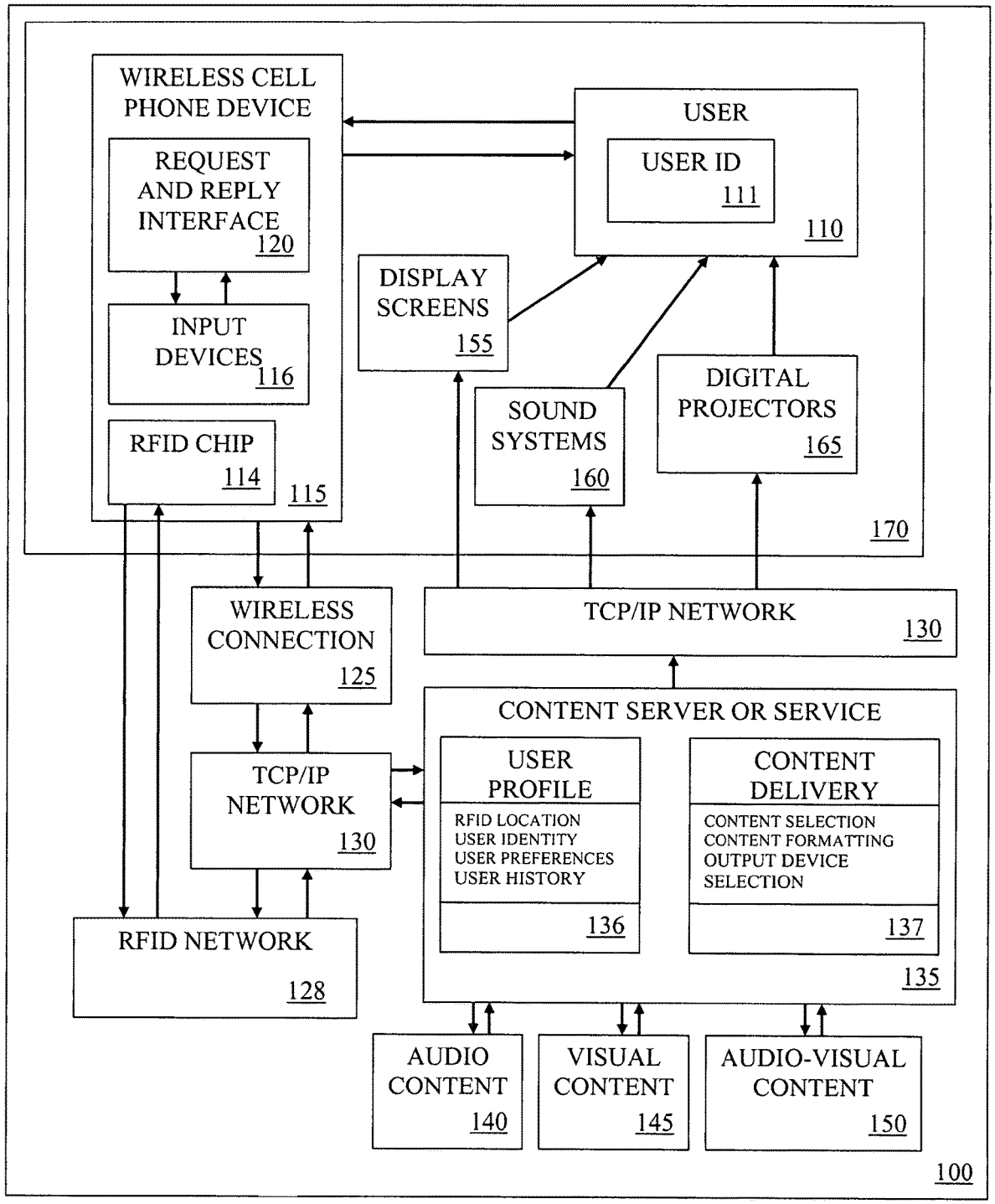
FIG. 5 illustrates a preferred embodiment for implementing a content delivery system that includes the use of a user's identity, physical location, preferences and history to select the content, the formatting of the content and the output devices to which the content will be delivered in accordance with the principles of the present invention.

With reference now to FIG. 5, there is illustrated a preferred embodiment for implementing a content delivery system containing a content server or service, itself containing a user profile and content delivery capability, in which the user 110 uses the wireless cell phone device 115 to obtain a wireless connection 125 with a TCP/IP network 130 that, in turn, accesses a content server or service 135. The user 110 uses the information provided by the request and reply interface 120 to provide a user ID 111, as well as to specify the content to be transmitted. As before, the information describing the content may be specified in its entirety via the wireless cell phone device 115, or, alternatively, through any combination of visual or audio information provided by the request and reply interface 120 and other information contained within the user's field of vision, hearing and control 170. Rather than specifying the respective display screens 155, sound systems 160 and or digital projectors 165, to which the content will be delivered, the RFID network 128 may be used to identify the physical location of the wireless cell phone device 115 via the RFID chip 114 and to communicate that information through the TCP/IP network 130 to the content server or service 135.

A user profile 136 associated with the user ID 111 may be used to provide user preferences and user history associated with the user ID 111 to a particular or several content delivery servers or services 137 in addition to RFID location information and the user ID 111. The content delivery server or service 137 uses the information to select and or format the content. Additionally, the content server or service 135 may use the physical location of the RFID chip 114 associated with the wireless cell phone device 115 to identity the particular or respective display screens 155, sound systems 160 and or digital projectors 165, to which the content can be delivered.

With further reference to FIG. 5 of the Drawings, once the user 110 has provided the user ID 111, the content server or service 135 may use the physical location of the RFID chip 114 associated with the cell phone device 115 in combination with information contained in the user profile 136 to perform content delivery 137 by both selecting and formatting the content, as well as selecting the output device or devices to which the content will be delivered without requiring any additional input on the part of the user 110, even as the user moves from one display screen 155, sound system 160 or digital projector 165 image to another.

Figure 6:
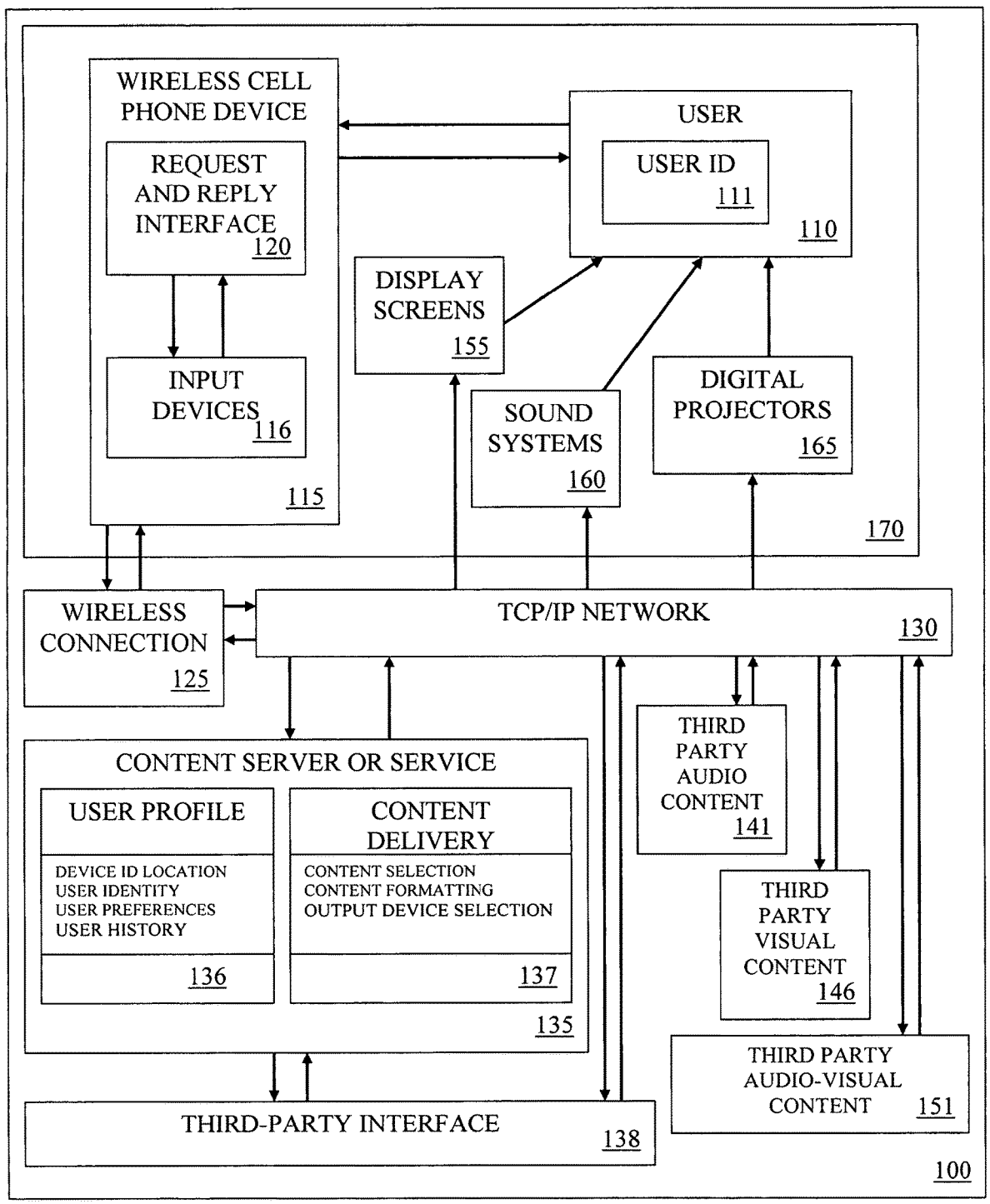
FIG. 6 illustrates another preferred embodiment for implementing a content deliver system that includes the use of third party audiovisual content in accordance with the principles of the present invention.

Finally, with reference now to FIG. 6, there is illustrated a preferred embodiment for implementing a content delivery system containing a content server or service, itself containing a user profile 136 and content delivery capability information 137, in which the user 110 uses the wireless cell phone device 115 to obtain a wireless connection 125 with a TCP/IP network 130 that, in turn, accesses a content server or service 135. The content server or service 135, may, in turn, use a third-party interface 138 to access third-party audio content 141, third-party video content 146, and/or third-party audio-video content 151. The user 110 uses the information provided by the request and reply interface 120 to provide a user ID 111, as well as to specify the content to be transmitted. As before, the information describing the content may be specified in its entirety via the wireless cell phone device 115, or, alternatively, through any combination of visual or audio information provided by the request and reply interface 120 and other information contained within the user's field of vision, hearing and control 170. A user profile 136 associated with the user ID 111 may be used to provide user profile data, e.g., device ID location user ID 111, preferences and usage history, and content delivery data 137, e.g., selection and formatting information, via a third-party interface 138 to one or more third-party content providers providing third-party audio content 141, third-party video content 146 and/or third-party audio-video content 151 to the user 110.

The principles of the present invention are applicable in a variety of social contexts, e.g., on a street having advertising or other visual or audio media strategically placed, and at an airport, bus terminals or other transportation facilities where people congregate. For example, a kiosk or booth may be employed to facilitate a user sharing information or content with others within an immediate area or broader range. The possibilities for an entertainment usage are considerable, e.g., music concerts, sports events, gambling casinos, trade shows and many other venues. The system and methodology of the instant invention offer flexible ways for a user to mass communicate, sharing their content with a large number of contiguous individuals.

Although one usage is by individuals sharing with friends and/or contiguous users affiliated in some fashion, e.g., close friends or anonymous groups, it should be understood that the user can instead be an automated user, such as a program at a kiosk in an airport, which communicates with passersby. Similarly, on a street, a store may likewise communicate anonymously and perhaps randomly with passersby by targeting them for a special message or advertisement pursuant to a protocol, algorithm, randomly, sequentially or otherwise. In this commercial context, the content can be varied or identical, e.g., differing devices may require some reconfiguration of the content. With some additional information about the particular passersby, the message can be more targeted and individualized to that specific person, e.g., a snippet of the latest album to a teenager or a car ad to an older person. The possibilities for advertising revenues are equally considerable, and the boundaries of this innovation bound only by the communications limitations placed on the content.

Although the preferred implementation of the innovation herein is individualized sharing of content to others, it is nonetheless understood that the principles can also be employed more broadly to encompass automated push and pull messaging delivered to friends or total strangers, small numbers of people or masses, individuals or devices, and other parameters.

It should, of course, also be understood that the substantially contiguous devices can be audio devices within hearing range or other ranges of the user's device, display devices within visual range, e.g., within line-of-sight view, of the user's device, or some other measure that facilitates the shared nature of the social contact, facilitates social interaction in general, facilitates mass and targeted communications socially or commercially, among friends, acquaintances, groups, teams or other groupings. The principles of the present invention address various granularities of transmission, e.g., social or commercial one-on-one, one-to-few or one-to-many, and an advantage to the user (and the recipients) is the flexibility of use.

It should also be understood that the user, once the content is being or has been distributed to the at least one contiguous device, may interact with the content during or after delivery.

Although the shared experiential aspect of the present invention is a focus, it should be understood that the shared nature of the experience need not actually be experienced simultaneously or contemporaneously, but can be delayed and experienced or played at a later time. For example, a message, social or commercial, can be queued for later or even played at a scheduled time.

It should also be understood that the networks 100 illustrated in the Drawings can be either a private network with subscribers, with groups delineated therein pursuant to various protocols, or public, e.g., the Internet. An Internet-based Application Service Provider (ASP) could thereby provide server capability to tie a large network of users to a large network of contiguous user devices, as is understood in the art.

The foregoing description of the present invention provides illustration and description, but is not intended to be exhaustive or to limit the invention to the precise one disclosed. Modifications and variations are possible consistent with the above teachings or may be acquired from practice of the invention. Thus, it is noted that the scope of the invention is defined by the claims and their equivalents.

What is claimed is:

1. A method for content comprising:
    transmitting, by a first device, a signal to a source device to forward content therein to a second device,
    wherein said signal is a wireless signal, and the transmitting of said wireless signal is initiated by using at least one input control of said first device,
    wherein said input control information from said first device is stored on said source device,
    wherein said content is resident on said source device, said content on said source device not under the control of a user of said first device;
    receiving, at said second device, said content from said source device; and
    displaying said content on said second device,
    wherein said first device and said second device are contiguous and communicate across a wide area network, said first device being in a first home system, and said second device being in a second home system, said second device not controlled by the user of said first device,
    wherein input control information from said first and second device are stored on a third device, said third device in communication with said source device, and
    wherein stored input control information associated with said first device and said second device and stored on said third party device is used by said third party device to identify content available on said source device for selection by said user of said first device when communicating with contiguous devices.

2. The method according to claim 1, wherein input control information associated with said first device and said second device is stored on said source device.

3. The method according to claim 2, wherein stored input control information associated with said first device and said second device is used by said source device to identify content available for selection by said user of said first device when communicating with contiguous devices.

4. The method according to claim 2, wherein said stored input control information can be shared by said user of said first device with other users.

5. The method according to claim 4, wherein said shared input control information can be used by said source device to identify content available for selection by members within a group of users who have shared said input control information.

6. The method according to claim 1, wherein said stored input control information can be shared by said user of said first device with other users.

7. The method according to claim 6, wherein said shared input control information can be used by said third party device to identify content available for selection by members within a group of users who have shared said input control information.

8. The method of claim 1, further comprising, prior to the transmission of said signal, the step of:
    locating, by a locator, the physical location of said first device and the physical location of at least said second device, wherein said second device is one of a plurality of devices contiguous said first device, each having a different physical location.

9. The method according to claim 1, wherein said second device is selected from the group consisting of: a display screen, an acoustical sound system, a digital projection system, and combinations thereof.

10. The method according to claim 1, wherein said signal is transmitted to a content server through a TCP/IP network.

11. The method according to claim 1, wherein the user of said first device specifies said second device via a wireless linkage, wherein said wireless linkage is selected from the group consisting of a short range frequency hopping radio link device, a radio frequency identification link, and combinations thereof.

12. The method according to claim 1, wherein said first device receives said content synchronously with said second device, said user of said first device participating in a common event designated by said user.

13. The method according to claim 1, wherein the user of said first device selects an input selected from the group consisting of: an audio and/or video data stream for transmission to the first device through audio/video outputs on said first device, an audio and/or video data stream for transmission to the first device through an internal speaker/display of said first device, an audio and/or video data stream for transmission to the first device through an external headset/display of the first device, and combinations thereof.

14. The method according to claim 1, wherein said first device is a wireless cellular device or smartphone.

15. A content distribution device comprising:
- a transceiver, said transceiver in wireless communication with a communications network,
- a control command, said control command transmitted by said transceiver and instructing forwarding content stored on a source device to a second device,
- wherein said content distribution device and said second device are contiguous and communicate across said communications network, said second device being out of the home system for and not controlled by a user of said content distribution device,
- wherein said wireless communication is initiated by using at least one input control,
- wherein said input control information from said first device is stored on said source device,
- wherein input control information from said first device and said second device are stored on a third device, said third device in communication with said source device, and
- wherein stored input control information associated with said first device and said second device and stored on said third party device is used by said third party device to identify content available on said source device for selection by said user of said first device when communicating with contiguous devices.

16. The content distribution device according to claim 15, wherein said content distribution device receives said content synchronously with said second device, said user of said content distribution device participating in a common event designated by said user.

17. A system for selected content distribution, said system comprising:
- at least one content distribution device in a communications network, said communications network including a plurality of devices in communication therein, said plurality of devices including said at least one content distribution device of a user and a plurality of contiguous devices; and
- a selected content distribution signal, said signal being initiated by said user from said at least one content distribution device, said signal indicating content selected by said user for forwarding to given ones of said plurality of contiguous devices,
- whereby said user and said selected ones of said plurality of contiguous devices, upon displaying said content, participate in a common event designated by said user,
- wherein said selected content distribution signal is a wireless communication initiated by said user using at least one input control of said at least one content distribution device,
- wherein said input control information from said at least one content distribution device is stored on at least one of said plurality of contiguous devices, and
- wherein input control information from said at least one content distribution device and said plurality of contiguous devices are stored on another device, said another device in communication with said at least one of said plurality of contiguous devices, and
- wherein stored input control information associated with said first device and said second device and stored on said third party device is used by said third party device to identify content available on said source device for selection by said user of said first device when communicating with contiguous devices.

* * * * *